(12) United States Patent
Radermacher et al.

(10) Patent No.: US 11,122,663 B2
(45) Date of Patent: Sep. 14, 2021

(54) MONITORING LIGHTING

(71) Applicant: SIGNIFY HOLDING B.V., Eindhoven (NL)

(72) Inventors: Harald Josef Günther Radermacher, Aachen (DE); Peter Deixler, Arlington, MA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/345,967

(22) PCT Filed: Oct. 18, 2017

(86) PCT No.: PCT/EP2017/076598
§ 371 (c)(1),
(2) Date: Apr. 29, 2019

(87) PCT Pub. No.: WO2018/077693
PCT Pub. Date: May 3, 2018

(65) Prior Publication Data
US 2020/0060005 A1 Feb. 20, 2020

(30) Foreign Application Priority Data

Oct. 28, 2016 (EP) .................................. 16196331

(51) Int. Cl.
*H05B 45/20* (2020.01)
*H05B 45/24* (2020.01)
(Continued)

(52) U.S. Cl.
CPC .......... *H05B 45/50* (2020.01); *F21Y 2105/10* (2016.08); *F21Y 2115/10* (2016.08)

(58) Field of Classification Search
CPC .................... F21Y 2105/10; F21Y 2115/10
See application file for complete search history.

(56) References Cited

U.S. PATENT DOCUMENTS 9,247,623 B2  1/2016 Recker et al.
9,441,795 B2  9/2016 Segers et al.
(Continued)

FOREIGN PATENT DOCUMENTS

GB        1577875 A    10/1980
WO     2012085794 A1    6/2012
(Continued)

OTHER PUBLICATIONS

Transient and Frequency Analysis, EE531 (Semester II, 2010) (Year: 2010).*

*Primary Examiner* — Henry Luong

(57) ABSTRACT

A method of determining the power consumption of a lighting device, the lighting device comprising a lamp unit for emitting illumination to illuminate a space, and a powering device which supplies an electrical power signal to power the lamp unit to emit said illumination. The method comprises: storing power consumption data of a plurality of types of powering device under different lamp unit loading conditions; at the lamp unit, determining a type of the powering device to which the lamp unit is coupled; at the lamp unit, determining an operating status of the lamp unit; determining the corresponding power consumption of the powering device from the stored power consumption data, based on the determined type of powering device, and the operating status of the lamp; and calculating the total power consumption of the lighting device as the sum of the power consumption of the powering device and the lamp unit.

12 Claims, 2 Drawing Sheets

(51) Int. Cl.
  *H05B 47/14*    (2020.01)
  *H05B 45/50*    (2020.01)
  *F21Y 105/10*   (2016.01)
  *F21Y 115/10*   (2016.01)

(56) References Cited

U.S. PATENT DOCUMENTS

| | | |
|---|---|---|
| 9,474,126 B2 | 10/2016 | Hilbe et al. |
| 2008/0088180 A1* | 4/2008 | Cash .................. H02J 3/14 |
| | | 307/31 |
| 2010/0181925 A1 | 7/2010 | Ivey et al. |
| 2010/0231363 A1* | 9/2010 | Knibbe .............. H04L 12/2803 |
| | | 340/286.02 |
| 2012/0043909 A1 | 2/2012 | Bloom et al. |
| 2012/0229040 A1 | 9/2012 | Brown et al. |
| 2013/0221867 A1* | 8/2013 | Deppe ............... H05B 33/0809 |
| | | 315/224 |

FOREIGN PATENT DOCUMENTS

| | | |
|---|---|---|
| WO | 2012139691 A1 | 10/2012 |
| WO | 2016128500 A1 | 8/2016 |

* cited by examiner

MONITORING LIGHTING

CROSS-REFERENCE TO PRIOR APPLICATIONS

This application is the U.S. National Phase application under 35 U.S.C. § 371 of International Application No. PCT/EP2017/076598, filed on Oct. 18, 2017, which claims the benefit of European Patent Application No. 16196331.9, filed on Oct. 28, 2016. These applications are hereby incorporated by reference herein.

TECHNICAL FIELD

The present disclosure relates generally to lighting devices, and particularly but not exclusively to determining the power consumption of a lighting device including a lamp unit and a powering device (e.g. a ballast).

BACKGROUND

In modern lighting installations, lighting devices are often equipped with advanced functionality including processing and communications to provide so called "connected lighting" systems. These functions allow multiple lighting devices to be networked together and controlled more efficiently and intelligently that "dumb" devices. As well as lighting control commands being sent to lighting devices, the devices can store information and output information, for example for diagnostic purposes. This enables illumination of environments such as homes, offices, and other indoor or outdoor spaces.

Legacy lighting devices do usually not have such functionality. In legacy lighting installations, such functionality can however be added when replacing components, if the new replacement components are equipped with this functionality. In this respect, the first replaced component of a lighting device is usually the lamp unit since traditional incandescent and fluorescent lamps usually have a relatively limited lifetime while other components will support longer life. Also traditional lamps are increasingly being replaced with LED lamps, which offer efficiency improvement. For example, tube LEDs (TLEDs) can be used to replace fluorescent tubes.

LED retrofit lamps are usually adapted to fit into the socket of the traditional lamp and are configured for use with the existing powering device of the lighting device, such as, for example ballasts for powering gas discharge lamps and transformers for powering halogen lamps. Since LED lamps usually require other power parameters than traditional lamps, LED retrofit lamps have adaption circuitry which receives the power signal from the existing powering device and converts this signal into a suitable power signal for powering the LED light engine. Thus, only the lamp has to be replaced while all other components including the existing powering device of a lighting device can continue be used.

WO2016/128500 shows a smart light that is capable to reporting its consumption together with the consumption of the ballast but the lamp should be configured with the information related to the ballast.

However, in typical "connected lighting" systems, intelligence and commination functions are usually found connected to or integrated in the powering device such as a ballast. Therefore, limited opportunity is provided for upgrading a lighting system when replacing the lamp unit.

SUMMARY

It would be desirable for a lighting device to be provided with certain diagnostic capability based in the lamp unit, such as a power monitoring capability.

Accordingly, in one aspect of the present invention there is provided a method of determining the power consumption of a lighting device, wherein the lighting device comprises a lamp unit for emitting illumination to illuminate a space, and a powering device which supplies an electrical drive signal to power the lamp unit to emit said illumination; wherein said method comprises storing power consumption data of a plurality of types of powering device under different lamp unit loading conditions; at the lamp unit, determining a type of the powering device to which the lamp unit is coupled, wherein said determination is based on an analysis of the electrical power signal received at the lamp unit from the powering device; at the lamp unit, determining an operating status of the lamp; determining a corresponding power consumption of the powering device from the stored power consumption data, based on the determined type of the powering device type, and on the operating status of the lamp; and calculating the total power consumption of the lighting device as the sum of the power consumption of the powering device and the lamp unit.

In this way, a more accurate value of power usage can be obtained including losses in the powering device or ballast. Furthermore, since it is possible—in embodiments—to perform the method entirely in the lamp unit, this accuracy can be provided in a legacy system by replacement of only the lamp unit.

In embodiments therefore, the power consumption data is stored in the lamp unit, and in further embodiments, the determining of the power consumption of the powering device and the calculating of the total power consumption of the lighting device are performed in the lamp unit (e.g. by an embedded processor).

The total power consumption can be communicated to other devices, and in embodiments the method further comprises reporting the calculated power consumption from the lamp unit to a monitoring system via a communications link.

In alternative embodiments the determination of the power consumption of the powering device and the calculation of the total power consumption of the lighting device need not necessarily be performed in the lamp unit. Instead, in embodiments the method may comprise reporting the determined type of the powering device and the operating status of the lamp unit from the lamp unit to a monitoring system via a communications network, wherein said determining of the power consumption of the powering device and said calculating of the total power consumption of the lighting device are performed at the monitoring system.

As another example, the power consumption of the powering device by be determined by the lamp unit but the calculation of the total power consumption of the lighting device may be performed at the monitoring system.

The term powering device as used herein relates to a device included in the lighting device for supplying power to the lamp of the lighting device. Usually, the powering device receives a power signal from a source external to the lighting device and modifies and/or transforms this power signal in order to power the lamp. Examples of such powering devices include ballasts for powering gas discharge lamps and transformers for powering halogen lamps, particularly low voltage halogen lamps.

In embodiments, the determination of the type of powering device to which the lamp unit is coupled is based on an analysis of the electrical power signal received at the lamp unit from the powering device. This may comprise determining at least one of the voltage, current, waveform, frequency, polarity, or spectrum of the electrical signal. Such analysis may result in characteristic parameter signals or values, which can be compared to known signals or values to identify a powering device or device type for example. Such embodiments are particularly advantageous as they work even with a "dumb" powering device (e.g. legacy ballast) that cannot send a digital data signal to the lamp unit to report any identifier of the powering device.

In embodiments, stored power consumption data comprises a plurality of data values of losses of the powering device under a corresponding plurality of different loading conditions, and in further embodiments stored power consumption data comprises a standby power value and an operating efficiency. Based on the type of stored data it will be understood that determining the power consumption of the powering device may comprise determining an estimated value.

In embodiments, said determining of the corresponding power consumption of the powering device may comprises interpolating between said data values.

In embodiments the lamp unit may take the form of an LED-based replacement for a gas-discharge lamp (e.g. fluorescent tube) or for an incandescent lamp (e.g. filament bulb), and said powering device takes the form of a legacy powering device (e.g. ballast) designed to power a gas-discharge lamp or incandescent lamp with said electrical power signal. In one particular embodiment, the lamp unit may take the form of an LED-based replacement for a fluorescent tube a so-called "TLED" and the powering device may take the form of a ballast designed for a traditional fluorescent tube.

In a further aspect of the present invention there is provided Apparatus comprising: a lamp unit adapted to be fitted into a lighting device including a powering device for supplying an electrical power signal to power the lamp unit, the lamp unit comprising at least one light source for emitting illumination to illuminate a space when powered by the electrical power signal, and the lamp unit further comprising an evaluation module adapted determine an operating status of the lamp and a type of the powering device powering the lamp unit based on an analysis of the electrical power signal received at the lamp unit from the powering device. The apparatus comprises at least one processing unit adapted to access a data store storing power consumption data of a plurality of types of powering device under different lamp unit loading conditions, to determine the power consumption of the powering device based on the determined type of the powering device and on an operating status of the lamp with reference to the stored power consumption data for the determined powering device type, and to determine the total power consumption of the lighting device as the sum of the determined power consumption of the powering device and the lamp unit.

In embodiments, said data store and processing unit may be incorporated in the lamp unit, said evaluation module being implemented by the processing unit. The lamp unit may further comprise a communications unit arranged to report the calculated total power consumption to a monitoring system via a communications network.

Alternatively, the lamp unit may comprise a communication unit arranged to communicate the determined type of the powering device and the operating status of the lamp unit to a monitoring system via a communications network, and said at least one processing unit may be implemented in the monitoring system. The data store may also be implemented as part of the monitoring system, or at another source accessible by the monitoring system.

The invention also provides a computer program and a computer program product for carrying out any of the methods described herein and/or for embodying any of the apparatus features described herein, and a computer readable medium having stored thereon a program for carrying out any of the methods described herein and/or for embodying any of the apparatus features described herein.

The invention extends to methods, apparatus and/or use substantially as herein described with reference to the accompanying drawings.

Any feature in one aspect of the invention may be applied to other aspects of the invention, in any appropriate combination. In particular, features of method aspects may be applied to apparatus aspects, and vice versa.

Furthermore, features implemented in hardware may generally be implemented in software, and vice versa. Any reference to software and hardware features herein should be construed accordingly.

BRIEF DESCRIPTION OF THE DRAWINGS

Preferred features of the present invention will now be described, purely by way of example, with reference to the accompanying drawings, in which.

DETAILED DESCRIPTION OF EMBODIMENTS

Figure 1:
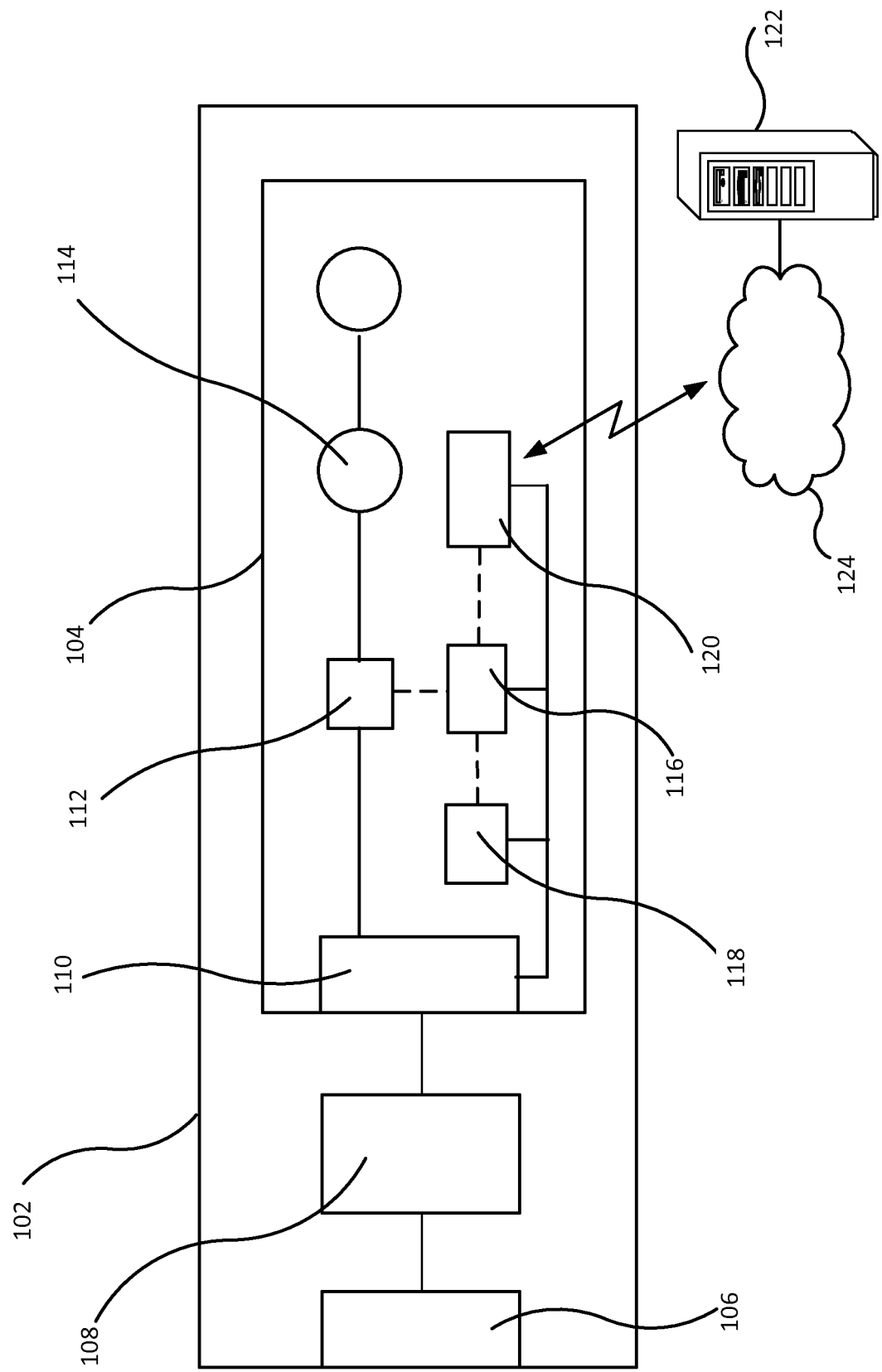
FIG. 1 illustrates schematically an exemplary lighting device.

FIG. 1 schematically shows a lighting device 102 which may be part of a lighting system comprising a plurality of lighting devices or which may be operated as a stand-alone lighting device. The lighting device 102 comprises a lamp 104 that particularly includes one or more light sources 114. The lamp 104 may be a retrofit lamp that replaces an original traditional lamp which was used in the lighting device 102 before, and which may for example have been a gas discharge lamp such as fluorescent tube lamp or a low-voltage halogen lamp, or an incandescent lamp such as filament bulb. In one particular embodiment, the lamp 104 takes the form of a TLED ("Tube-LED"), which is an LED based replacement for an old-fashioned fluorescent tube.

The lighting device 102 comprises a terminal 106 for connecting the lighting device to a power supply, which may be an electrical supply network of a building, for example, and which may provide an alternating current (AC) power signal having a voltage of 120 or 230 V and a frequency of 50 or 60 Hz. The power signal received via the terminal 106 is fed to a powering device 108 of the lighting device, which modifies and/or transforms the power signal received via the terminal 106 in order to generate a transformed power signal supplied to the lamp 104. The powering device 108 is configured for generating a suitable power signal for supplying the original traditional lamp with power. Where the original lamp was a fluorescent tube lamp, the powering device 108 may be a high-frequency (HF) ballast generating a HF signal with a frequency which may be larger than 10 kHz and which may particularly be larger than 20 kHz. Where the original lamp was a low voltage halogen lamp, the powering device 108 may include a transformer for transforming the power signal received from the power supply in accordance with the requirements of the halogen lamp, particularly the required voltage.

For receiving the original traditional lamp, the lighting device 102 comprises a respective lamp fixture (not illustrated in the figures). The retrofit lamp 104 is configured for being connected with or inserted into the lamp fixture of the lighting device 102. In one embodiment, the light source or sources 114 of the retrofit lamp comprises an LED unit comprising one or more LEDs. However, other types of light source are possible.

Depending on the configuration of the light source 114, the light source 114 may require a power signal having other characteristics than the power signal provided by the powering device 108. In order to supply the light source with power, the retrofit lamp 104 therefore comprises a driver circuit 112. The driver circuit 112 receives the power signal provided by the powering device 108 via an interface 110 of the lamp, which may be configured as an electrical terminal, and converts it into a power signal suitable for powering the light source 114. Suitable driver circuits 112 for accepting a power signal from the powering device 108 and processing the power signal in accordance with the needs of both the powering device and the lamp are known to a person skilled in the art and, thus, the driver circuit 112 is not described in greater detail here. The converted power signal provided by the driver circuit 112 is fed to the light source 114 of the retrofit lamp 104.

Lamp 104 is further provided with a processing unit 116, a communication unit 120, and optionally a data store 118. The data store is shown separately here but may be integrated with the processing unit 116 in embodiments. These three units can be powered by the powering device 108 via the interface 110 of the lamp. The processing unit can send and receive date to and from the data store and the communication unit, and optionally also with the driver circuit 112, as shown by dashed lines in FIG. 1.

The communication unit 120 may send messages via a wireless transmission channel, which may be an optical link, such as, for example, an infrared channel or a visible light communication (VLC) channel; or a radio-frequency (RF) link, such as, for example, a Wifi, Zigbee, Bluetooth or 3GPP link; or a wired connection such as an Ethernet connection. In this way messages may be sent to a monitoring system 122 via any suitable network 124, comprising for example a wireless local area network (WLAN), mobile cellular network, the Internet, and/or a wired local area network (LAN). The monitoring system 122 may for example comprise a central controller of a lighting system, e.g. implemented on a server comprising one or more server units at one or more geographic sites. As another example, the monitoring system 122 may be implemented by means of a distributed control function distributed throughout a plurality of other lighting devices which have a corresponding communications capability.

The processing unit 116 is adapted to analyse power consumption and power losses in the lamp 104, and also in the powering device 108, as will be explained below.

Figure 2:
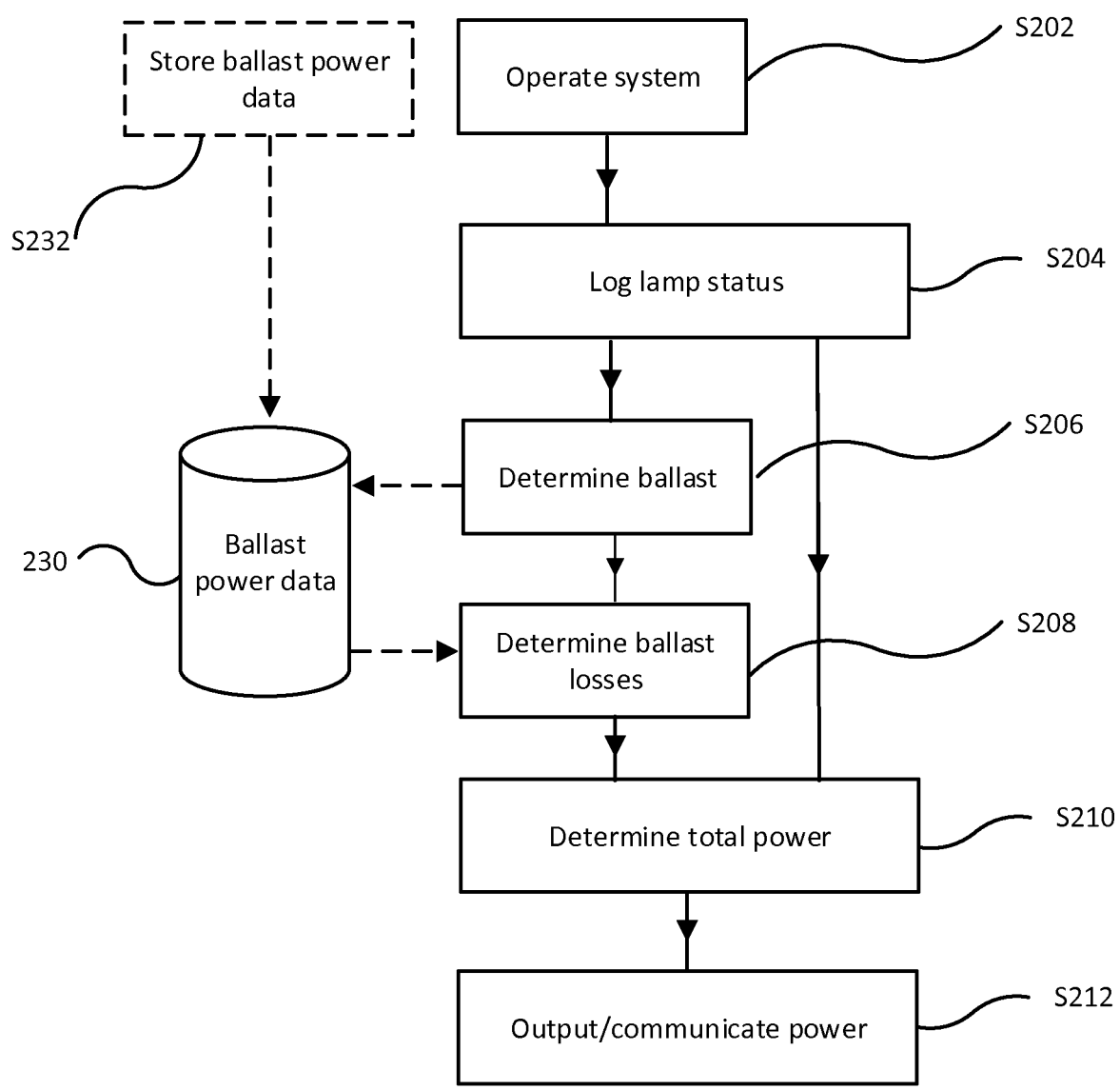
FIG. 2 illustrates a method of determining power consumption of a lighting device.

Referring to FIG. 2, at step S202 the system is operated to begin the process. The system will typically be a lighting system comprising a controller and multiple lighting devices, but may be a single lighting device.

At step S204, the lamp status is logged or determined. This may be performed in a number of different ways, but results in knowledge or data concerning the output of the light source or sources 114 of the lamp unit. In embodiments it may therefore acquire information of the number and/or configuration of such light sources. The operating status of the light sources is also determined. In the simplest example this can be an on/off status for example. However, the operating status may include further information such as a brightness value or equivalently a diming setting, or even colour or hue information in an example where the lamp unit is capable of reproducing different colours, for example where multiple individual LEDs of different colours are included and individually controllable.

At step S206, the lamp unit determines the type of powering device 108 (e.g. ballast) to which it is connected, and from which it is drawing power. Step S206 is illustrated here occurring after logging the lamp status, but this step can be performed at any point before step S208.

In embodiments, the lamp unit is provided with the capability to analyse the "upstream" powering device e.g. ballast) 108 based on the electrical power signal provided by the powering device, in order to determine what type of powering device 108 the lamp 104 is connected to. This can be performed by an evaluation module, which may be implemented in the form of software arranged to run on the processing unit 116, for example. This module is configured to analyse one or more characteristic aspects of the electrical power signal such as its voltage, current, waveform, frequency, polarity, and/or spectrum, etc. and based thereon to determine a characteristic signature present in the power signal characteristic of the particular type (e.g. model or series) of the powering device 108 to which the lamp 104 is currently connected. Examples of such a signature which may be extracted from the power signal include an overall time interval in which the electric signal is provided by the powering device, a frequency of the electric signal provided by the powering device, a variation of a voltage amplitude of the electric signal and an estimated starting time between a zero crossing of an input signal to the powering device and an initial voltage amplitude of the electric signal provided by the powering device. The parameter signal(s) may be selected on the basis of the type of powering device 108 included in the lighting device 102.

Determination of a particular powering device type may be performed by referencing measured or observed characteristic parameters, with known values for certain types of powering device. Even if a specific model cannot be determined, it may be sufficient to determine the class of device.

Consider for example the signal from a ballast 108 to a lamp 104. This may for example comprise two galvanically coupled (cable & socket) sub-signals, which may be sent via a "hot wire" and a "return wire", or in the case of an TLED most often 4 wires, two on each end of the discharge tube to support the previously present filaments. Such signals do not only contain the energy in a suitable form (voltage, current, frequency, polarity, . . . ) for powering the lamp, but these signals also contain information about the type of the ballast. This information is simply present in the electrical signals. Normally, a lamp will not use the information present in these signals, but will only consume the energy in these signals.

In embodiment of the present invention on the other hand, the lamp 104 will capture and use this information. The ballast 108 will be of a certain type, e.g. a certain brand, from a certain series of ballasts (such as IC-based or self-resonant, etc.). This will cause the output of the ballast to contain information on the type. This information is, along with the power, received by the retrofit lamp and processed there. Such information may be directly visible to the processing unit 116, and/or may be received indirectly, e.g. extracted from the power processing stage. As an example: a fluctuation of the voltage amplitude may cause the power processing control loop to counteract, so the control loop signals of the power processing unit will be impacted by the fluctuation. Hence, these signal may offer access to the information without extra effort.

Some particular examples for determining a characteristic propriety of a particular type of ballast are given below, but these are not limiting.

A first example is achieved by self-resonating HF-TL ballast detection. HF Ballasts are often based on resonant half bridge topologies. The bus voltage (received via a bridge rectifier directly or via an intermediated PFC-Stage) is stabilized and buffered by an electrolytic capacitor. From there, power is delivered to a resonant tank, which delivers an amplitude modulated HF-signal to the lamp's load. In such an arrangement, a detection of the ballast type is possible by monitoring the frequency of the received HF voltage, which is normally in the range of typ. 20 . . . 200 kHz. Different ballast types have different characteristic frequency ranges.

A second example is achieved by resonant tank probing. As a variant of the first example above, the lamp 104 may have means to adjust its input impedance, e.g. by switching a capacitor across the input terminals. This will detune the resonant tank, causing the frequency to change. This change in the normal and the extra loaded situation is another characteristic parameter that can be used to identify the ballast 108.

A third example relates to an IC-based HF-TL-Ballast. A TL-Ballast may also be based on IC-control rather than on full self-resonant operation. These IC ballasts generate control signals to (potentially integrated) power transistors actively, applying certain pre-heat and operation procedures. Start-up-time, and/or frequency slope, etc., are well defined (part of info can be found in IC datasheet). Therefore such information can be taken as characteristic of the ballast type.

A further example is detection via filament drive signal. The filaments of a TL-Tube can be heated in different ways. Since the TLED is exposed to the same drive signal, it can also use this information. A basic different is voltage or current drive. In voltage drive, via an extra transformer winding or even an extra transformer, a voltage is applied across the filament on one or either side of the tube. In current drive, a current is injected. Using different filament emulation, the type of drive can be determined. Thus the lamp 104 can be arranged to probe the filament drive signal to determine the type. Different filament emulations can be used statically (use a different filament on the two sides and detect the different in voltage of current between the two sides) or dynamically (switch between different filament emulation circuits and detect the difference between the switching states).

The above are only examples. Once given the idea by the present disclosure, the skilled person will realise various properties of the power signal from a ballast or other such powering device 108 that can be used as characteristic of a type of the powering device 108.

The option of inferring the type from one or more characteristic properties of the power signal is preferred, since this enables the detection without the need for any intelligence or transmitter to be included in the powering device. For example, this technique works for a legacy ballast such as a "dumb" ballast of an old-fashioned fluorescent tube. In this case the intelligent TLED can infer the type of the ballast from a characteristic signature in the power from the dumb ballast.

At step S208, ballast losses are determined, based on the information of the ballast type and the lamp status. This is typically accomplished by referencing a database or information store, recoding information of various ballast types under different loading or operating conditions. This is reference in FIG. 2 by dashed lines to a ballast power data store 230, and implies an optional step S232 of storing the data in advance.

This information can be empirical data, generated in a dedicated test procedure, in a lab for example. Alternatively, such data can be gathered in a real environment, provided with dedicated measuring equipment. The information can then be used in other installations without requiring such measuring equipment. Such information is typically stored in data store 118, but may alternatively be stored centrally, and accessed via communication unit 120. A further option is that such data may be exchanged between lighting devices. For example, if there is no central data store, but a given lighting device does not have information of a specific ballast or a specific loading condition, it may be possible that such information is stored at another lighting device, and this information can be sent, optionally via a central controller, to the lighting device in question.

To illustrate more clearly the type of information which can be gathered, the following examples are provided:

| For a ballast type ABC from brand XYZ: | For a ballast type EFG from brand XYZ: | For a ballast type HIJ from brand UVW: | |
|---|---|---|---|
| No load power = 1 W | No load power = 1.5 W | No load power = 1.3 W | ... |
| Power with 2 × 20 W loading = 44 W (=4 W losses). | Power with 2 × 20 W loading = 47 W (=7 W losses). | Power with 2 × 20 W loading = 45 W (=5 W losses). | ... |
| Power with 2 × 36 W loading = 80 W (=8 W losses). | Power with 2 × 36 W loading = 86 W (=14 W losses). | Power with 2 × 36 W loading = 84 W (=12 W losses). | ... |
| Power with 1 × 20 W = 23 W (=3 W losses) | Power with 1 × 20 W = 24 W (=4 W losses) | Power with 1 × 20 W = 24 W (=4 W losses) | ... |
| ... | ... | ... | ... |

Where for example 2×20 W loading may refer to two individual 20 W lighting elements 114 of the lamp 104 being turned on, and such like for the other entries. In another example, the entries in this table could represent different loading power levels on a dimming scale (e.g. for a lamp 104 dimmed by pulse width modulation).

Note also that the determination at step S208 may comprise, in some cases, interpolating between the finite scenarios stored in the data store 230 to accommodate the particular ballast and status currently detected.

In the above example, specific load types and loss levels are recorded, however more generalised data can be used:
Ballast series DEF from Brand PQR:

2 W in standby mode and 85% efficiency for lamp operation.

Further, if the ballast type cannot be identified, or is not known, default data can be used:
Default data:
Standby=3 W, Efficiency=75% for lamp operation.

Therefore, depending on the result of the determination of the ballast type, and the availability of ballast types in the stored information, the most appropriate result can be provided in order of accuracy, as set out above from exact data, to generic data, to default data.

At step S210, the total power for the lighting device is determined. This is calculated as the sum of the power of the lamp unit and the power (or losses) of the powering device or ballast. The lamp power is easily known by the lamp unit 104, or can easily be measured by the lamp unit itself.

At step S212, the total power is reported. This report may be transmitted from the communications unit 120 via the network 124 to the monitoring system 122, e.g. a central controller. In an example of a lighting system including multiple lighting devices, reporting of power consumption in this way can allow power consumption to be monitored more accurately, and may result in changes to the operating status of certain lighting devices to reduce power consumption for example, or may result in reconfiguration of the system, or a prompt or suggestion for system reconfiguration.

Outputting or reporting of power data may be in response to a request from a central controller, or may be periodic, for example every N minutes. In such a case the data reported will typically be the instantaneous power consumption. However, other types of reporting are possible, covering total (i.e. ballast plus lamp) consumption over time periods in the future or the past for example.

In one embodiment, the lamp 104 can log instantaneous power consumption readings, and report periodically, either providing all readings stored since the last reporting, or for example a statistical measure such as average consumption or peak consumption. Furthermore, the lamp 104 can predict or estimate future consumption over a given period of time. This is particularly relevant in cases where the device has a degree of intelligence to control the light output, possibly as part of a connected lighting system, having rules or routines defining patterns of light outputs. If for example a lighting device can determine that it is to remain in a certain condition for a period of time, it can report power usage for that time. Alternatively, if it determines that it is to gradually increase or decrease in brightness, it can similarly estimate consumption for that period. In this case, a future lamp status, or a series of statuses can be used in place of the current status determined in step S204 of FIG. 2. As a final example, if a lighting device determines that it is to enter a standby state for a certain period, the consumption of the ballast alone (lamp power=zero) can be reported for that period.

It will be understood that the present invention has been described above purely by way of example, and modification of detail can be made within the scope of the invention. Each feature disclosed in the description, and (where appropriate) the claims and drawings may be provided independently or in any appropriate combination.

In the above embodiments, steps S202 to S212 are all performed by the lamp 104 (e.g. by the embedded processing unit 116). However this need not be the case in all possible embodiments. Alternatively for example, the lamp's processing unit 116 may be configured to report the lamp operating status (as determined at step S206) and the determined type of the powering device to the monitoring system 122, via the communications unit 120 and network 124, and the monitoring system 122 may be configured to compute the power consumption there. In some particular embodiments, the status may be reported by the lamp 104 on demand, when polled by the monitoring system 122 (again via the network 124 and communications unit 122). The type of the powering device 108 may be reported from the lamp 104 to the monitoring system beforehand, e.g. upon installation of the lamp 104 into the powering device 108 for the first time.

The various illustrative logical blocks, functional blocks, modules and circuits described in connection with the present may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the function or functions described herein, optionally in combination with instructions stored in a memory or storage medium. The described processing unit 116 may also be implemented as a one or a combination of computing devices, e.g., a combination of a DSP and a microprocessor, or a plurality of microprocessors for example. Conversely, separately described functional blocks or modules may be integrated into a single processor. The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, and a CD-ROM.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of determining power consumption of a lighting device, the lighting device comprising a lamp unit for emitting illumination to illuminate a space, wherein the lamp unit comprises a plurality of individually-controllable LEDs operating according to color information and/or hue information, and a powering device which supplies an electrical power signal to power the lamp unit to emit said illumination, the method comprising:

storing power consumption data of a plurality of types of powering device under different lamp unit loading conditions, wherein the type of powering device is at least one of a manufacturer model, manufacturer series, or a class of powering device;

at the lamp unit, determining a type of the powering device to which the lamp unit is coupled, wherein said determination is based on an analysis of the electrical power signal received at the lamp unit from the powering device;

at the lamp unit, determining an operating status of the lamp unit, wherein the operating status comprises the color information and/or the hue information;

determining a corresponding power consumption of the powering device from the stored power consumption data, based on the determined type of the powering device type and on the operating status of the lamp unit; and calculating a total power consumption of the lighting device as a sum of the power consumption of the powering device and the lamp unit, wherein said analysis comprises determining at least a frequency of the electrical power signal.

2. The method according to claim 1, wherein said power consumption data is stored in the lamp unit.

3. The method according to claim 1, wherein said determining of the corresponding power consumption of the powering device and said calculating of the total power consumption of the lighting device are performed in the lamp unit.

4. The method according to claim 3, further comprising reporting the calculated total power consumption from the lamp unit to a monitoring system via a communications network.

5. The method according to claim 1, further comprising reporting the determined type of the powering device and the operating status of the lamp unit from the lamp unit to a monitoring system via a communications network, wherein said determining of the corresponding power consumption of the powering device and said calculating of the total power consumption of the lighting device are performed at the monitoring system.

6. The method according to claim 1, wherein said stored power consumption data comprises a plurality of data values of losses of the powering device under a corresponding plurality of different loading conditions.

7. The method according to claim 6, wherein said determining of the corresponding power consumption of the powering device comprises interpolating between said plurality of data values of losses.

8. The method according to claim 1, wherein said stored power consumption data comprises a standby power value and an operating efficiency.

9. The method according to claim 1, wherein the lamp unit takes a form of an LED-based replacement for a gas-discharge lamp or incandescent lamp, and said powering device takes a form of a legacy powering device designed to power the gas-discharge lamp or incandescent lamp with said electrical power signal.

10. Apparatus comprising:
a lamp unit adapted to be fitted into a lighting device including a powering device for supplying an electrical power signal to power the lamp unit, the lamp unit comprising at least one light source for emitting illumination to illuminate a space when powered by the electrical power signal, wherein the light source comprises a plurality of individually-controllable LEDs operating according to color information and/or hue information, and the lamp unit further comprising an evaluation module adapted determine an operating status of the lamp unit and a type of the powering device powering the lamp unit based on an analysis of the electrical power signal received at the lamp unit from the powering device; and at least one processing unit adapted to access a data store storing power consumption data of a plurality of types of powering device under different lamp unit loading conditions, to determine the power consumption of the powering device based on the determined type of the powering device and on an operating status of the lamp unit with reference to the stored power consumption data for the determined powering device type, and to determine a total power consumption of the lighting device as a sum of the determined power consumption of the powering device and the lamp unit, wherein the operating status comprises the color information and/or the hue information, wherein the type of powering device is at least one of a manufacturer model, manufacturer series, or a class of powering device, wherein said analysis comprises determining at least a frequency of the electrical power signal.

11. The lamp unit according to claim 10, wherein said data store and said at least one processing unit are incorporated in the lamp unit, said evaluation module being implemented by the at least one processing unit.

12. The lamp unit according to claim 10, further comprising a communication unit adapted to communicate the determined type of the powering device and the operating status of the lamp unit to a monitoring system via a communications network, and wherein said at least one processing unit is implemented in the monitoring system.

* * * * *